United States Patent [19]

Ryan et al.

[11] 4,309,288
[45] Jan. 5, 1982

[54] ROTARY DRUM FILTER

[75] Inventors: Douglas G. Ryan, Rockaway; Derek J. Watridge, Randolph, both of N.J.

[73] Assignee: Exxon Research & Engineering Co., Florham Park, N.J.

[21] Appl. No.: 175,941

[22] Filed: Aug. 7, 1980

[51] Int. Cl.³ ............................................. B01D 33/08
[52] U.S. Cl. .................................. 210/39 S; 210/404
[58] Field of Search ............. 210/404, 784, 392, 395, 210/396, 402

[56] References Cited

U.S. PATENT DOCUMENTS

| | | | |
|---|---|---|---|
| 2,332,917 | 10/1943 | Jordan et al. | 210/202 |
| 2,710,693 | 6/1955 | Manley et al. | 210/202 |
| 2,889,931 | 9/1959 | Buttolph | 210/404 |
| 3,323,654 | 6/1967 | Lee | 210/404 |
| 3,363,774 | 1/1968 | Luthi | 210/404 |
| 3,837,499 | 9/1974 | Luthi | 210/404 |
| 4,157,301 | 6/1979 | Wegener | 210/404 |
| 4,266,413 | 5/1981 | Yli-Vakkuri | 20/404 X |

*Primary Examiner*—Thomas G. Wyse
*Attorney, Agent, or Firm*—Mazer Edward H.

[57] ABSTRACT

An improved rotary filter is described. A baffle means is disposed between the filter drum and the filter cloth in substantial alignment with at least some of the circumferential openings in the filter drum to decrease the erosive effects on the filter cloth of fluid discharged through the circumferential openings in the filter drum.

13 Claims, 5 Drawing Figures

ROTARY DRUM FILTER

BACKGROUND OF THE INVENTION

This invention relates to an improved continuous rotary drum filter means. More specifically, the subject invention is related to a continuous rotary drum filter for the separation of petroleum liquids, such as lube oils, from solids, such as paraffins.

The separation of mixtures of compounds can be accomplished by various unit operations including distillation, solvent extraction and fractional crystallization. Fractional crystallization is particularly well suited to the purification of many mixtures economically in a one-stage operation. Frequently, the crystallization operation is combined with another unit operation to produce an improved separation process. In petroleum processing operations fractional crystallization is often utilized to separate waxy compounds from the lube oil fraction. Frequently, a solvent is added to the mixture to provide more favorable conditions for crystal growth and to dilute the resultant chilled slurry to thereby permit continuous oil-wax separation.

One type of filter particularly well suited to fractional crystallization, in general, and wax-lube oil separation, in particular, is the rotary drum filter. In this type filter, a filter drum continuously rotates within a filter vat containing the mixture to be separated. In one phase of the rotation, vacuum is applied to the filter drum causing a major portion of liquid to be drawn through the filter cloth and fluid conduits, while the solids and a minor amount of liquid are trapped by the filter cloth and build up to form a cake. During another phase of the rotation, high velocity gas is passed outwardly through the fluid conduits to purge the liquid and break the filter cake away from the cloth. During this purge cycle, liquid adhering to the walls of the conduits may be directed against sections of the filter cloth by the high velocity gas, thereby causing localized erosion of the filter cloth particularly near the ends of the filter drum. Since rotary filters frequently are thirty feet or more in length, filter cloth replacement is relatively expensive and necessitates complete shutdown of the filter.

One method for minimizing the erosive effects of the liquid on the filter cloth has been to have an elongated purge cycle in which the lead fluid conduit in the direction of flow is evacuated while the lag conduit, or conduit immediately following the lead conduit, is purged with high velocity gas. Liquid purged out of the lag pipe is directed into the lead pipe before it can strike the filter cloth. At a predetermined point in the rotation, the vacuum is discontinued and the purge gas and any remaining liquid is directed outwardly. Extension of the time period during which the combination of purge and evacuation is accomplished would decrease the amount of liquid remaining in the lag fluid conduit when evacuation of the lead fluid is discontinued. However, this would require a decrease in the rotational speed of the filter drum and/or a decrease in the other filter drum cycle times. Either of these methods thus would decrease the filtration capacity of the unit.

Yet another method of decreasing the erosive effects of the liquid would be to use a thicker or more erosion-resistant filter cloth. Use of a thicker filter cloth would increase the filter cloth cost and also increase the tendency of the filter cloth to bow while also decreasing the filter capacity. In addition, the thicker the filter cloth, the more difficult it is to remove the wax fines from the cloth. Use of a more erosion-resistant filter cloth may not be advantageous, since a more erosion-resistant cloth may not have desirable filter cake discharge characteristics.

Accordingly, it is desirable to produce a modified rotary filter in which erosion of the filter cloth by entrained liquid is reduced or eliminated without decreasing the filter throughput or increasing the cost of replacement filter cloths.

It is also desirable to have a rotary filter design which minimizes erosion and which is relatively inexpensive and reliable.

It is also desirable to have a rotary filter design which is easily adaptable to rotary filters currently in use for decreasing the rate of filter cloth erosion.

SUMMARY OF THE INVENTION

The subject invention is directed at an improved rotary filter of the type comprising:

(a) a filter vat adapted to contain a filterable slurry;

(b) a rotatable filter drum at least partially disposed in said filter vat, said drum having circumferential openings disposed therein in substantial alignment with fluid conduits disposed in said drum;

(c) means to rotate said drum in said filter vat;

(d) fluid conduits disposed in said drum in substantial alignment with the circumferential openings in the drum, said conduits communicating with a valve means;

(e) a valve means communicating with said fluid conduits for regulation of the fluid flow through said conduits and through the circumferentially disposed openings in said filter drum;

(f) a filter cloth disposed over the circumferential openings in said filter drum; and, (g) means for removing the filter cake from the filter cloth, whereby during one phase of each rotation of said filter drum, the slurry is drawn onto the filter cloth with at least a portion of the filtrate passing through the openings into the fluid conduits while the solids form a filter cake on the filter cloth, and during another phase of each rotation, high velocity fluid passes from the conduit through the circumferential openings to lift the filter cake from the filter cloth, the improvement wherein a baffle means is disposed between the filter drum and the filter cloth in substantial alignment with at least one of the openings in the filter drum to decrease the kinetic energy of the fluid passing from the conduit through at least one of the circumferential openings prior to the fluid contacting the filter cloth to thereby decrease the erosive effects of the fluid on the filter cloth.

In a preferred embodiment of the subject invention the baffle means comprises a relatively thin steel plate having one or more anchoring legs at one end which are bent under the cross members of the drum surface grid, while the opposite end of the baffle is fastened to the grid and to a channel member. The baffles preferably are disposed in substantial alignment with at least a substantial number of the lag openings adjacent to one end of the filter drum.

DETAILED DESCRIPTION OF THE INVENTION

Figure 1:
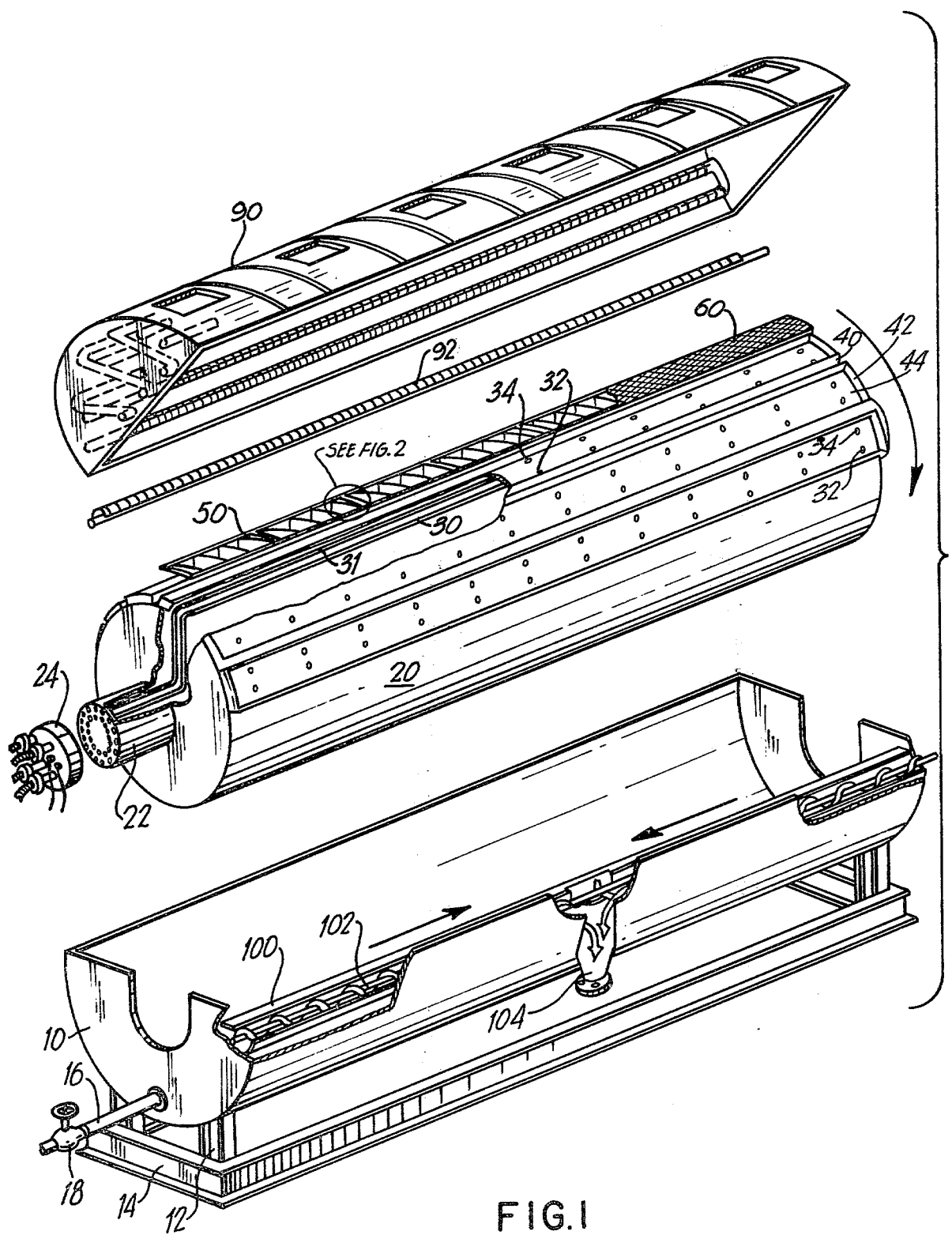
FIG. 1 is an exploded isometric drawing of a typical rotary filter incorporating the subject invention.
Figure 2:
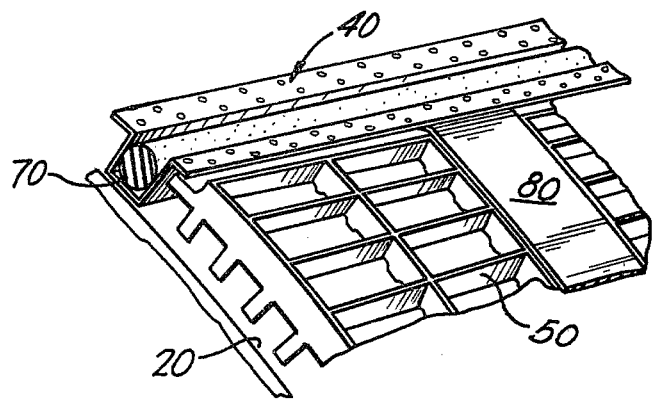
FIG. 2 is an enlarged isometric drawing of the encircled area of FIG. 1.
Figure 4:
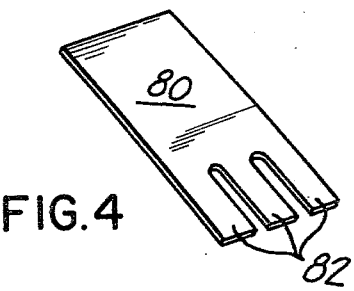
FIG. 4 is a plan drawing of one embodiment of the baffle means.

Referring to FIG. 1, an exploded, simplified isometric assembly drawing of a typical rotary drum filter is shown. The filter includes a filter vat, generally indicated as 10 and a filter drum generally indicated as 20. Vat 10, having a substantially semicylindrical shape is supported by columns 12 above base 14. An inlet 16 communicates with vat 10 and with the source of the slurry to be separated (not shown). A level controller (not shown) usually is added to control the level of slurry in vat 10 by regulating valve 18 in inlet 16. A filter hood 90 having an overall semicylindrical shape has a plurality of perforated spray headers or drip pipes 92 disposed therein parallel to the axis of rotation of drum 20 to wash the wax cake formed in the drum as hereinafter described. Filter drum 20 is of a generally overall cylindrical shape having a diameter slightly less than that of the diameter of vat 10, such that drum 20 is rotatable about its axis in vat 10 on a pair of trunions 22. One of the pair of trunions 22 has a plurality of holes each of which communicates with conduit means such as fluid conduits 30 and 31 and with trunion valve means 24 to perform varying operations during each revolution of drum 20 as described hereinafter. The other trunion communicates with a conventional drum rotation means (not shown) to rotate drum 20 in vat 10. Each conduit 30 and 31 extends along substantially the entire axial length of drum 20. A series of uniformly spaced channel sections 40 extend outwardly from the curvilinear surface of drum 20 parallel to the axis of rotation. Terminal sections 42 disposed near the ends of drum 20 connect each section 40 to an adjacent channel section, to thereby define a series of segments 44 circumferentially disposed around drum 20. Each segment 44 has two series of circumferential openings through drum 20 evenly spaced along substantially the entire axial length of each segment to form circumferential rows with one series of openings 32 in general alignment with fluid conduit 30 and with the other series of openings 34 in general alignment with fluid conduit 31. In each segment 44 the leading opening 32 in the direction of rotation hereinafter is referred to as the lead opening while the immediately adjacent trailing opening 34 is referred to as the lag opening.

A means for removing the filter cake from filter cloth 60 such as doctor knife 100 disposed in a compartment in vat 10 is shown discharging the filter cake into a screw conveyor 102 which directs the filter cake out of vat 10 through outlet 104.

Referring to FIGS. 1-4 within each segment 44 is disposed a filter grid 50 to maintain filter cloth 60 spaced apart from drum 20. Filter cloth 60 is stretched over channel sections 40 and grids 50 and is retained in position by caulking bar 70 compressingly inserted in channel section 40 and by circumferential wires (not shown). A baffle means, such as baffle 80, is disposed between grid 50 and filter cloth 60 in substantial alignment with at least one circumferential opening to decrease the kinetic energy of the fluid discharged as hereinafter described.

It has been found that the liquid remaining in conduit 31 tends to be blown to the ends of the conduit when gas is passed outwardly through conduit 31, while flow to conduit 30 is blocked by means of trunion valve 24. Accordingly, baffles 80 preferably should be located in substantial alignment with at least certain of the circumferential openings 31 at the ends of drum 20, as hereinafter described to decrease the erosive effects of the liquid on filter cloth 60.

In a preferred embodiment, baffle 80 comprises a generally rectangular section having, at one end at least one leg means 82 which may be fixedly attached to grid 50 as by bending. In the embodiment shown, baffle 80 comprises a plurality of leg means 82 which are bent under adjacent sections of grid 50. The opposite end of baffle 80 may be fastened as by rivet 84 to channel section 40 and to grid 50 to further assure that the baffle 80 will not become loosened during rotation of drum 20. Since the diameter of drum 20 generally is relatively large, baffles 80 may be either planar or curvilinear. Baffle 80 should be positioned in substantial alignment with at least one circumferential lag opening 34 to dissipate at least a portion of the kinetic energy of the fluid discharged from fluid conduit 31 through opening 34. Baffle 80 preferably should have dimensions such that substantially all of the fluid discharged from opening 34 strikes the baffle before contacting filter cloth 60. The dimensions of baffle 80 thus will be a function at least in part of the dimensions of opening 34, the velocity of the fluid discharged, and the distance between openings 34 and baffle 80. The thickness of baffle 80 is not critical and need only be thick enough to deflect the fluid discharged from opening 34, over a prolonged period of time without significant erosion, deformation or corrosion. The thickness thus will be a function of the materials of construction of the baffle. In an application such as the separation of lube oil from wax, baffle 80 preferably is constructed of type 316 stainless steel approximately 1/16 inch thick. To minimize erosion of filter cloth 60, baffles 80 should be disposed between at least one opening 34 and the filter cloth to deflect fluid discharged from the lag opening. Baffles 80 preferably are disposed between at least a substantial number of selected lag openings 34 in drum 20 and the filter cloth to deflect at least a portion of the fluid discharged from these lag openings 34. In preferred embodiments of the invention, baffles are disposed in substantial alignment with all lag openings 34 in the last circumferential row of lag openings adjacent to one or both ends of drum 20, since the residual liquid tends to collect in conduit 31 near the ends of the drum. More preferably baffles 80 are disposed in alignment with all lag openings 34 in the last two rows of the lag openings adjacent to one or both ends of drum 20. It is also anticipated, however, that baffles 80 could be disposed in general alignment with all or substantially all lag openings 34 in drum 20.

Figure 3:
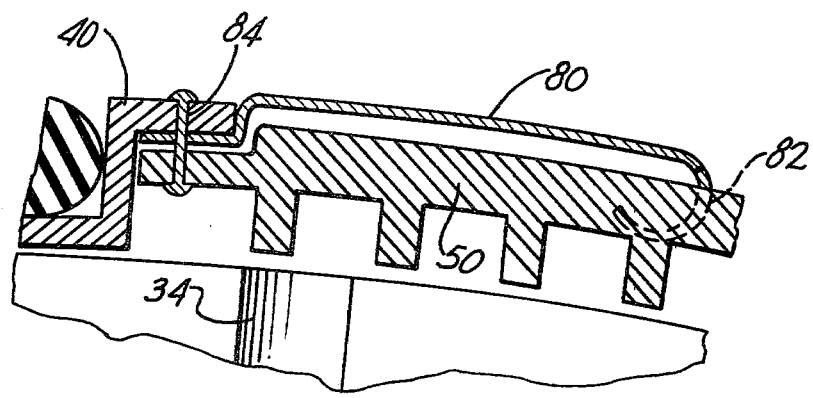
FIG. 3 is an enlarged partial sectional view of the drum surface, channel member and grid showing one method for affixing the baffle means.

A typical filter for the separation of wax from lube oil has a filter drum 20 thirty feet in length and eleven and one-half feet in diameter. This drum has an effective filtering area of approximately 1000 square feet with 720 two-inch diameter circumferential openings 32, 34 disposed about the drum substantially as shown in FIG. 1. In this embodiment, 120 one-sixteenth inch thick steel baffles 80 having overall shapes similar to that in FIG. 4 were affixed onto grid 50 substantially as shown in FIG. 3 in substantial alignment with all lag openings 34 in the last two circumferential rows of lag openings adjacent to each end of drum 20. The overall length of each baffle 80 was 4 inches, exclusive of leg means 82, and the width was also 4 inches. Leg means 82 were approximately 2 inches long and ½ inch wide.

Figure 5:
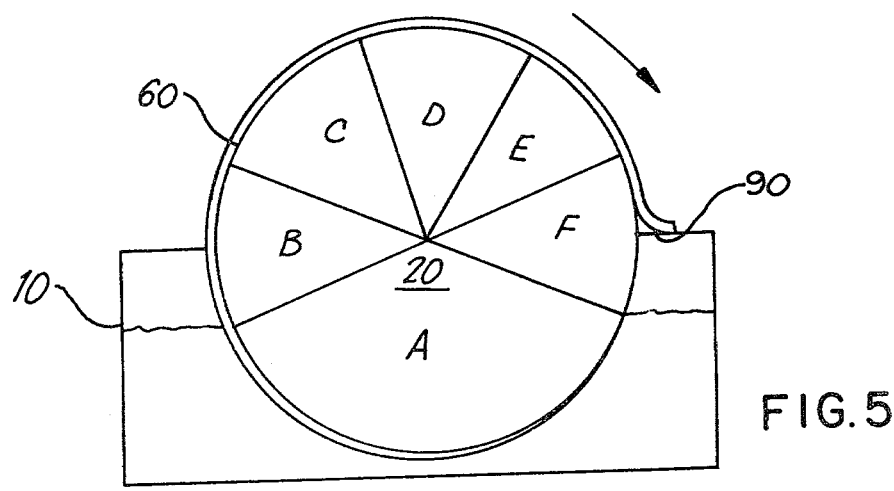
FIG. 5 is a simplified cross-sectional view of a filter drum indicating the operations performed during each rotation of the filter drum.

The sectors of FIG. 5 illustrate the varying operations performed simultaneously by a typical rotary filter such as that of FIG. 1. When a point on filter cloth 60 is in a position included within sector A, that point is under vacuum. Filtrate is drawn through filter cloth 60, circumferential openings 32 and 34 and fluid conduits 30 and 31, respectively, into a filtrate storage facility (not shown). The solid wax crystals are retained on filter cloth 60 and buildup to form a wax filter cake. As each point on filter cloth 60 rotates to sector B, that point rises out of the slurry. Vacuum continues to be applied to sector B to continue to draw any remaining filtrate through circumferential openings 32 and 34 and fluid conduits 30 and 31, respectively thereby further drying the filter cake. When the point rotates still further to a position within sector C, valve means 24 continues evacuation of fluid conduits 30 and 31 while a wash fluid is sprayed through spray headers 92 in filter hood 90 to wash filtrate from the wax cake at least a portion of the filtrate remaining on the wax cake as well as wash fluid passes through the wax cake, filter cloth 60, circumferential openings 32, 34 and fluid conduits 30, 31, respectively, for removal from the filter. The wash fluid generally comprises a liquid which is miscible with the filtrate but not with the solids of the filter cake. In the separation of lube oil from wax, this wash liquid frequently is a mixture of ketones or ketone/toluene. When the point on filter cloth 60 rotates to the position shown by sector D, the filter cake is again dried by discontinuing external wash flow and continuing to apply vacuum to sector D which pulls wash from the wax cake through circumferential openings 32, 34, and fluid conduits 30, 31, respectively. As the point rotates still further to sector E, purge gas, typically having a velocity of about 100 feet/second, is supplied to fluid conduit 31 communicating with lag opening 34 while the immediate adjacent lead opening 32 continues to be maintained under vacuum. This serves to cause some of the liquid remaining in fluid conduit 31 communicating with lag opening 34 to flow into fluid conduit 30 communicating with lead opening 32. As the point rotates still further to sector F, lead opening 32 is no longer evacuated. The purge gas which is called blow gas at this point, plus any remaining liquid in fluid conduit 31 communicating with lag opening 34 is discharged against baffle 80 and, after deflection, contacts filter cloth 60, causing the cloth to billow out slightly, thereby facilitating the subsequent removal of the cake by doctor knife 100. It should be noted if baffles 80 were not installed in the subject filter, liquid remaining in conduits 30 would be conveyed by the high velocity purge gas against filter cloth 60 causing the cloth to erode, particularly at the ends of drum 20 where the liquid tends to collect.

The relative length of phases A–F is shown in FIG. 5 for a typical filter. It is to be understood that the length of time that any given location on filter cloth 60 spends in a particular phase may be adjusted by varying the size of the sector devoted to that phase and by varying the rate of rotation of drum 20.

While the invention has been described with respect to a specific embodiment, it will be understood that this disclosure is intended to cover any variations, uses and adaptations of this invention including such departures from the present disclosures as come within known or customary practice in the art to which the invention pertains and as fall within the scope of the invention.

What is claimed is:

1. In a rotary filter means of the type comprising:
   (a) a filter vat adapted to contain a filterable slurry;
   (b) a rotatable filter drum at least partially disposed in said filter vat, said drum having circumferential openings disposed therein in substantial alignment with fluid conduits disposed in said drum, said drum including a filter grid disposed on the outer periphery of said filter drum;
   (c) means to rotate said drum in said filter vat;
   (d) fluid conduits disposed in said drum in substantial alignment with the circumferential openings in the drum;
   (e) a valve means communicating with said fluid conduits for regulation of the fluid flow through said conduits and through the circumferentially disposed openings in said filter drum;
   (f) a filter cloth disposed over the circumferential openings in said filter drum and over said filter grid, said cloth maintained in spaced-apart relationship from said filter drum by said filter grid; and
   (g) means for removing the filter cake from the filter cloth, whereby, during one phase of each rotation of said filter drum, slurry is drawn onto the filter cloth with at least a portion of the filtrate passing through the openings into the fluid conduits while the solids form a filter cake on the filter cloth and during another phase of each rotation high velocity fluid passes from the conduit through the circumferential openings to lift the filter cake from the filter cloth, the improvement wherein a baffle means is disposed between the filter grid and the filter cloth in substantial alignment with at least one of the openings in the filter drum said filter cloth communicating with said baffle means and with the filter grid, said baffle means having a surface generally coextensive with the outwardly extending surface of said filter grid to decrease the kinetic energy of the fluid passing from the conduits through at least one of the circumferential openings prior to the fluid contacting the filter cloth to thereby decrease the erosive effects of the fluid on said filter cloth.

2. The rotary filter means of claim 1 wherein the circumferential openings comprise a plurality of openings and wherein the baffle means comprises a plurality of baffles, said baffles positioned in substantial alignment with selected circumferential openings to thereby decrease the kinetic energy of fluid passing from the fluid conduits through the selected circumferential openings.

3. The rotary filter means of claim 2 wherein the plurality of openings comprises lag openings and lead openings disposed in circumferential rows along the length of said drum, and wherein said baffles are disposed in substantial alignment with at least a portion of the lag openings adjacent to at least one end of said drum.

4. The rotary filter means of claim 3 wherein the baffles are disposed in substantial alignment with at least all of the lag openings in one circumferential row adjacent to one end of said drum.

5. The rotary filter means of claim 4 wherein the baffles are disposed in substantial alignment with at least all of the lag openings in the two circumferential rows adjacent to both ends of said drum.

6. The rotary filter means of claim 5 wherein the baffles are disposed in substantial alignment with substantially all of the lag openings on said drum.

7. The rotary filter means of claim 1 wherein said baffle means communicates with said filter grid.

8. The rotary filter means of claim 7 wherein said baffle means is fixedly attached to said filter grid.

9. The rotary filter means of claim 8 wherein the baffle means includes at least one leg means adapted to being affixed to said filter grid.

10. The rotary filter means of claim 9 wherein the baffle means includes a plurality of leg means adapted to being affixed to said filter grid.

11. The rotary filter means of claim 1 wherein said means for removing the filter cake from the filter cloth comprises a doctor knife.

12. The rotary filter means of claim 1 wherein said baffle means has a generally planar section.

13. In a rotary filter means of the type comprising:
(a) a filter vat adapted to contain a filterable slurry;
(b) a rotatable filter drum at least partially disposed in said filter vat, said drum having circumferential lead and lag openings disposed therein in substantial alignment with fluid conduits disposed in said drum;
(c) means to rotate said drum in said filter vat;
(d) fluid conduits disposed in said drum in substantial alignment with the circumferential openings in the drum;
(e) a valve means communicating with said fluid conduits for regulation of the fluid flow through said conduits and through the circumferentially disposed openings in said filter drum;
(f) a filter cloth disposed over the circumferential openings in said filter drum;
(g) a filter grid disposed between the outer periphery of said filter drum and said filter cloth to maintain said filter cloth in spaced apart relationship from said filter drum; and
(h) means for removing the filter cake from the filter cloth, whereby during one phase of each rotation of said filter drum, slurry is drawn onto the filter cloth with at least a portion of the filtrate passing through the openings into the fluid conduits while the solids form a filter cake on the filter cloth and during another phase of each rotation high velocity fluid passes from the conduit through the circumferential openings to lift the filter cake from the filter cloth, the improvement wherein baffles having generally rectangular sections are affixed to said grid in substantial alignment with at least a substantial number of the lag openings adjacent to one end of said drum to decrease the kinetic energy of the fluid passing from the conduits through certain of the lag openings prior to the fluid contacting the filter cloth to thereby decrease the erosive effects of the fluid on the filter cloth, said filter cloth communicating with said baffles and with said filter grid.

* * * * *